(12) United States Patent
Chylinski

(10) Patent No.: US 10,064,385 B2
(45) Date of Patent: Sep. 4, 2018

(54) HORSE FEEDER FOR SLOW AND CONTROLLED GRAZING

(71) Applicant: Shawn Chylinski, North Vancouver (CA)

(72) Inventor: Shawn Chylinski, North Vancouver (CA)

(*) Notice: Subject to any disclaimer, the term of this patent is extended or adjusted under 35 U.S.C. 154(b) by 349 days.

(21) Appl. No.: 14/737,253

(22) Filed: Jun. 11, 2015

(65) Prior Publication Data

US 2015/0359190 A1    Dec. 17, 2015

Related U.S. Application Data

(60) Provisional application No. 62/010,951, filed on Jun. 11, 2014.

(51) Int. Cl.
*A01K 5/00* (2006.01)
*A01K 5/01* (2006.01)

(52) U.S. Cl.
CPC ..................... *A01K 5/01* (2013.01)

(58) Field of Classification Search
CPC ........ A01K 39/014; A01K 39/00; A01K 5/01; A01K 5/0107; A01K 5/008; A01K 1/10; A01K 5/0225; A01K 39/012; A01K 39/01; A01K 5/0114
See application file for complete search history.

(56) References Cited

U.S. PATENT DOCUMENTS

| | | | | |
|---|---|---|---|---|
| 1,474,922 | A * | 11/1923 | Zdzieblo | A01K 5/008 119/65 |
| 5,630,375 | A * | 5/1997 | Mann | A01K 5/0114 119/51.03 |
| 5,887,544 | A * | 3/1999 | Popelier | A01K 5/01 119/61.54 |
| 7,753,000 | B1 * | 7/2010 | Turner | A01K 5/01 119/57 |
| 8,381,684 | B2 * | 2/2013 | Crawford | A01K 5/01 119/61.1 |
| 8,887,665 | B2 * | 11/2014 | Rocker | A01K 5/0128 119/61.2 |
| 9,439,394 | B2 * | 9/2016 | Tharp | A01K 5/01 |
| 2004/0261725 | A1 * | 12/2004 | Myers | A01K 1/0107 119/51.01 |
| 2008/0156270 | A1 * | 7/2008 | Brickell | A01K 5/01 119/58 |
| 2014/0311413 | A1 * | 10/2014 | Hoysak | A01K 39/0113 119/61.1 |

* cited by examiner

*Primary Examiner* — Trinh T Nguyen

(57) ABSTRACT

Horse feeders comprising: a feeder body having a top and bottom and formed by surrounding at least one helical coil with a covering material, wherein the feeder contracts and expands by the elasticity of the helical coil and wherein the helical coil maintains a shape of the feeder body and confinement of feed, as the horse feeds.

11 Claims, 5 Drawing Sheets

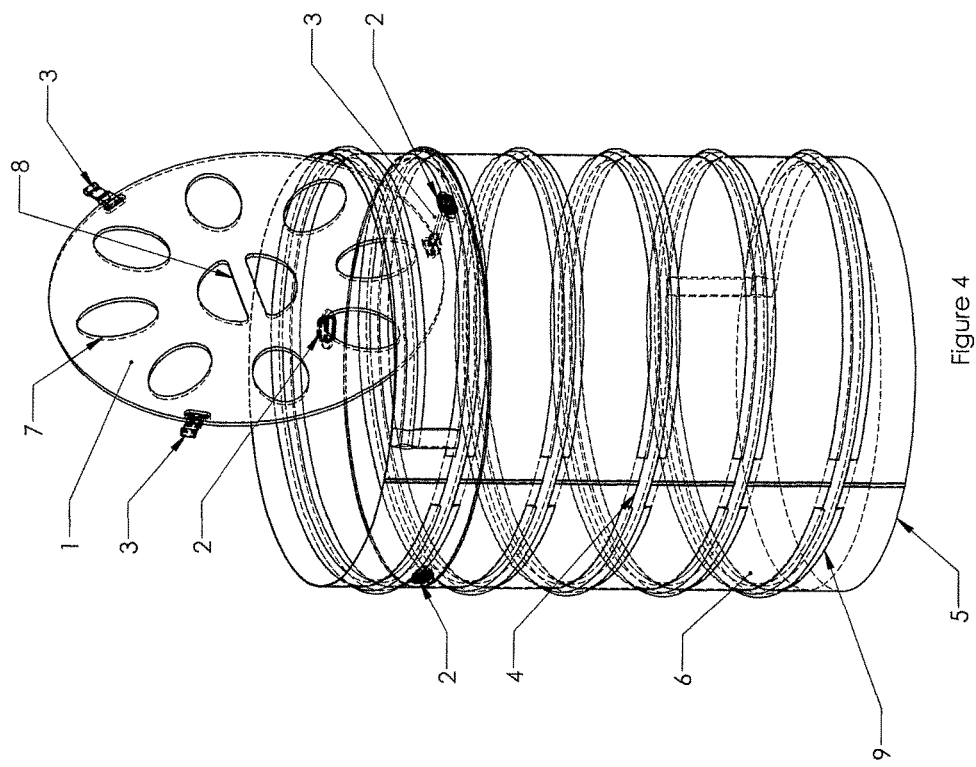
Figure 4
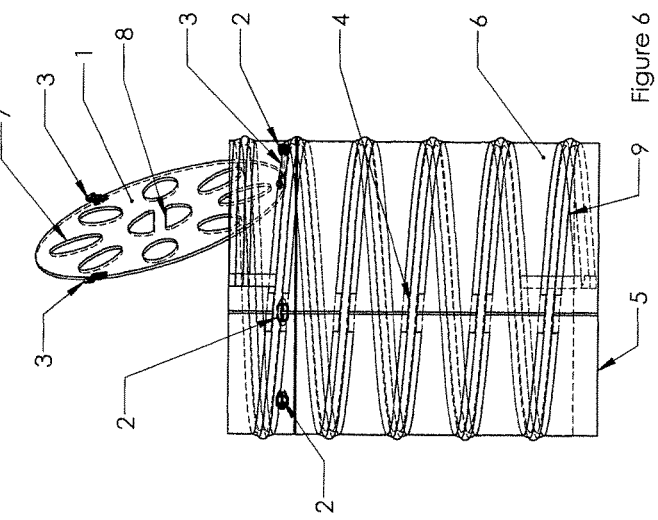
Figure 5
Figure 6

HORSE FEEDER FOR SLOW AND CONTROLLED GRAZING

CROSS REFERENCE TO RELATED APPLICATIONS

This application claims the benefit of U.S. Provisional Application No. 62/010,951, filed Jun. 11, 2014, the content of which is expressly incorporated herein by reference in its entirety for all purposes.

FIELD OF THE INVENTION

This invention relates generally to the field of animal feeders for the controlled consumption of hay or similar feed (particularly) to a horse, other equidae or similar grazing animal and wherein a receptacle is provided, having an open top through which animal can graze.

BACKGROUND OF THE INVENTION

In nature, horses chew their food slowly and thoroughly, therefore never over-consuming, while many domesticated horses or similar grazing animal are allowed to graze at pasture others are fed in a stall or other location. Additionally many pastured horses must also be stall fed at certain times of year when the pasture may be barren of food or when the weather conditions do not permit pasture feeding. The common food choice for stall fed horses is hay, sometimes mixed with food additives such as vitamins and the like. A normal horse consumes on the order of between 2-3 percent of its own weight in the dry weight equivalent of feed daily.

One problem associated with stall-feeding is that the animal eats too fast. The horse's receptors for feeling full are located in its chewing muscles—not its stomach. This is why it is essential that the horse chews feed slowly and vigorously. If the horse eats too fast, as is encouraged with traditional feeding methods, the animal will not feel content and full and therefore will overeat and feel stressed. Side effects of this state will cause the horse will be nervous, edgy and disobedient. A horse's stomach is relatively small for its size and food passes through in as little as 12 min. From the stomach the food passes on to the small intestine, where it stays for only about 90 min. This means that 90 minutes after the stomach is empty the small intestine is also empty. This creates a problem for the horse because of the continuous production of digestive fluids (acids), which ultimately burn the inside of the digestive tract when there is no food there to absorb such fluids. This is a situation that would always occur if when horse is fed 2-4 times per day as in traditional stall-feeding.

Fast eating by a horse can also results in result in potentially harmful side effect such as "choke" or esophageal obstruction. "Bolus eating" is an expression often used to describe feeding habits of horses that are permitted to eat hay free choice and en-masse, wherein the feed is consumed without being properly chewed, as is vital for proper digestion. Because horses sleep only 3 to 4 hours in a 24 hour period and usually no longer than 20 minutes at a time, food tends to be their main focus. A common practice by horse owners across the globe is to feed the animal 2 to 4 times per day and generally in quantities that can be consumed by the horse in one to two hours often causing one or more of the harmful effects explained above. An equally harmful practice is the commonly found bale-feeding method wherein large bales of feed are dumped into bulk feeding devices more suited for cattle or are just dropped on the ground. Such methods allow the horse to eat in a bolus manner with no controls to restrict the speed or quantity of feed consumption.

Slowing down the rate at which such animals can access feed such as hay means that the crucial process of digestion is slowed down such that vital nutrients in the feed are absorbed much more efficiently. A slow continuous feeding system simulates constant foraging, thereby stimulating the animal's digestive as nature has intended.

Certain mechanical devices have been proposed to control the speed with which the horse consumes hay in order to prevent both choke and overeating. Such devices, which work with varying degrees of effectiveness, tend to be complex in design and construction, making such devices expensive to manufacture, obtain and maintain. Furthermore, some known feeding devices are of a design that has the potential to cause injury to the animal during use.

A further issue relates to feeding position. Many known feeders do not allow a horse to eat in a natural grazing position. One type of feeder includes a basin with a grille for holding hay, where the grille slopes downward and away from the horse from top to bottom. There are also hay nets and bags which are suspended well above the ground. Because of this configuration, these feeders are usually located three to four feet above the ground so that the horse can access the feed. Unfortunately, this configuration results in the horse eating in an unnatural position with its head up at the grille of the feeder.

Some of these feeders are usually permanently mounted on an inside of the animal's corral or enclosure. These types of permanently mounted feeders have many drawbacks since they are difficult to clean or relocate because they cannot be easily removed from the enclosure. But even if these feeders were not permanently mounted, they are still difficult to access, relocate and fill with feed since they are located within the animal's enclosure. This difficulty comes from the need to enter the enclosure to gain full access to the feeder.

A further problem relates to delivery of "soaked hay" to horses. Soaking hay in water is a common strategy used to manage the nutrition of many horses. Current hay soaking recommendations include soaking hay for 30 minutes in warm or 60 minutes in cold water for removal of water soluble carbohydrates (WSC), potassium (K) and dust. Soaking hay is done to remove excess WSC, K and dust intake in horses diagnosed with or to prevent reoccurrence of laminitis. However, the soaking process is time-consuming, and soaked hay cannot be stored for extended periods due to the risk of mold.

It is an object of the present invention to obviate or mitigate all of the above noted disadvantages.

SUMMARY OF THE INVENTION

It is an object of this invention, in one aspect, to provide a feeder which dispenses small manageable bites of hay regulated by the horse.

It is an object of this invention to provide a feeder which enables containment of soaked hay for delivery to a horse, wherein the hay can be retained with reduced risk of mold formation.

It is an object of this invention to provide a feeder which, in one aspect, can be manipulated by the horse in a manner which mimics natural grass grazing by the horse.

It is an object of this invention to provide a feeder which, in one aspect, is collapsible and easily transported and stored, yet maintains its physical shape in use, even if contracted and then expanded again.

It is an object of this invention to provide a feeder which, in one aspect, can be loaded with hay, pre-soaked and presented for feeding to horse without the requirement of transferring hay from a soaking container to a feeding container.

The present invention provides, in one aspect, a horse feeder ("helix-flexible feeder") comprising:
  a) a feeder body having a top and bottom and formed by surrounding at least one helical coil with a covering material, wherein the feeder contracts and expands by the elasticity of the helical coil, and wherein the helical coil maintains a shape of the feeder body and confinement of feed, as the horse feeds; and
  b) a slow feeder plate releasably secured to the feeder body, forming a body lid which is hinged to open and expose an inner cavity of the feeder, said feeder plate comprising a plurality of access apertures there through, said apertures being sized such that, in use, access to feed in feeder is limited;
  wherein, use said body comprises feed, said slow feeder plate with the aid of the helical coil, rests upon feed contained with the feeder body and moves down, as feed is consumed said slow feeder plate being sized such that, in use, access to feed in feeder body is available but controlled.

The present invention provides, in another aspect, a horse feeder Solid/rigid soaking and draining feeder ("rigid soaking/draining feeder") comprising:
  a) a solid feeder body having an opening at a top end, said feeder body comprising a upper main feed chamber and a lower drainage chamber, said upper main feed chamber being larger than the lower drainage chamber;
  b) a drainage plate for separating the upper main feed chamber and the lower drainage chamber, said drainage plate comprising a plurality of drainage perforations of a size sufficient to permit excess water drainage from soaked hay without significant hay loss through said drainage perforations;
  c) a water egress portal from lower drainage chamber; and
  d) a slow feeder tray comprising a horizontal base and vertical flange, said tray being of a size to be received within the top end of the feeder, to rest upon any feed contained with the feeder and to move down, within feeder, as feed is consumed by the horse, said horizontal base comprising a plurality of access apertures there through, said apertures being sized such that, in use, access to feed in feeder by the horse is available but limited.

The horse feeders as described and claimed herein promote slow and regulated feeding of hay to horses. For the horse, there are significant health benefits, including reduction in conditions such as choking and colic (including sand colic wherein sand gets mixed with "on the ground" hay sources). Horse mood and disposition is enhanced due to the natural feeding pattern afforded by the feeders. Feed is available "on demand" leading to reduced anxiety. The motion of "pulling" hay from the apertures mimics the single strand natural resistance provided in nature (i.e. pulling grass from fields). From an owner/user perspective, there are additional advantages. Time-wise, a full day of feeding can be placed in a feeder, prevent an entanglement or injury to the horse; such that feed monitoring and control is visual and simplified (i.e. it will be apparent at the end of a day how much hay horse has consumed). Soaking hay, when required, is greatly simplified by both the helix flexible feeder and the solid draining feeder over alternative feeders. In both feeders, due to drainage arrangements, complete separation of any harmful residues from the hay can be achieved. Unlike conventional feeders (Slow down hay feeder), to effectively drain the water from the hay the entire feeder must be turned on its side to remove the water. This is very difficult and heavy for a person to do. The drainage chamber below, allows the user to unscrew a cap and drain the water from the hay without clogging of the drain as with other feeders (Porta Grazer)

Unlike other feeder designs (Porta Grazer) that utilize round holes in their feeder trays that are free spinning, and require that the forage be loaded in a specific way to allow the horse access to the forage effectively, then the animal must learn to rotate the tray to eat the forage underneath the feeder tray or plate. The elliptical feeder tray holes in the solid feeder (rigid soaking and draining feeder) cause a slight rotation in the feeder tray as the animal pulls the forage through the holes in the feeder tray. The slight rotation repositions the feeder tray on the forage so that there are no voids created below the feeder tray holes where the animal has already eaten. The repositioning of the feeder tray as the animal eats also allows the animal to eat the forage between the holes, giving the animal complete access to the forage underneath the tray without frustration or special orientation of the forage or having the animal to learn to rotate the tray which is an improvement on other feeder designs. Unlike other conventional slow feeders, where the restrictor plates or pans are fixed (slow down hay feeder) and require a large number of holes to provide the horse with access to the feed, in effect the larger number of holes does not slow the animal feed rate down.

Hand in hand with these advantages are a variety of financial benefits to the user.

These and other advantages will become apparent throughout this specification.

BRIEF DESCRIPTION OF THE DRAWINGS

FIG. 4 is a perspective view of a helix flexible feeder in extended open view;

FIG. 5 is a top plan view of a helix flexible feeder in extended open view;

FIG. 6 side view of a helix flexible feeder in extended open view;

Figure 1:
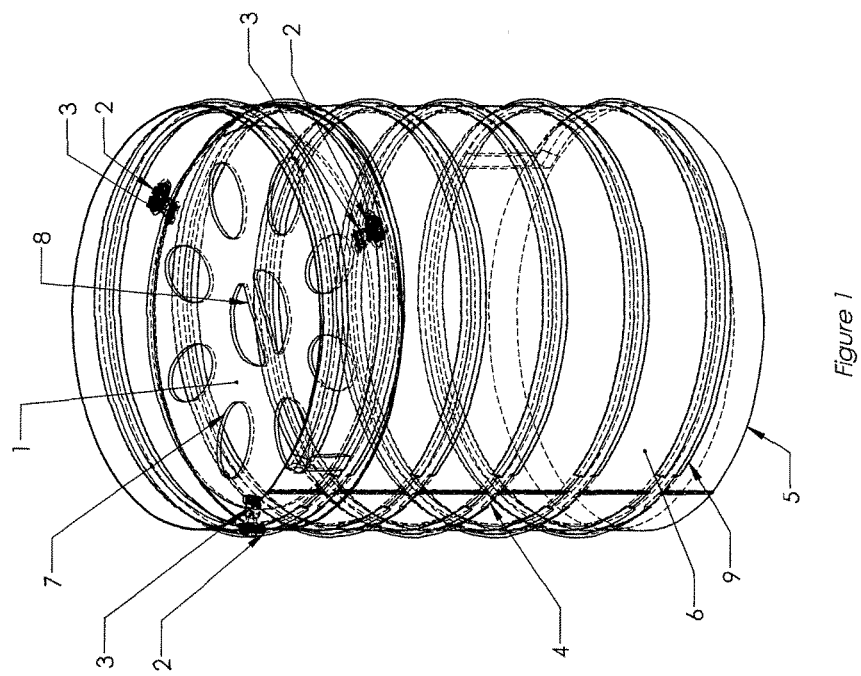
FIG. 1 is a perspective view of a helix flexible feeder in extended closed view.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I. Terms

The term "product" means any machine, manufacture and/or composition of matter, unless expressly specified otherwise.

The term "method" means any process, method or the like, unless expressly specified otherwise.

Each process (whether called a method or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The shape of the body, as provided herein is not limited to any one configuration. While cylindrical and conical may be preferred for the flexible helix embodiment, other shapes may be used, if desired.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains.

The term "covering material" includes, one aspect, 1) porous, mesh like material through which water may pass or in another aspect, 2) a non-porous material to contain the feed (for example, hay) and through which water may not pass.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R.sctn.1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

II Overview

The invention comprises two variants of a slow feeder which both enable 1) a horse to safely graze for longer and sustained rate with minimal hay loss and with means to monitor feed consumption/reduce losses and 2) increased effectiveness in the manner to soak hay, and way in which the soaked hay may be directly used, without loss of volume, contamination, molding and associated health risks.

The helix flexible body feeder is highly portable and, due to helical coil construction, can be compressed to about a 3-4 inch height for ease of transport and then expanded for use. One key to the functionality of the apparatus is the helical coil s with a flexible covering material. The flexible covering material contains the hay yet can, as described herein, be water porous mesh or non-porous material. In one aspect, wherein covering material is porous, wet hay can simply be placed in the body of the feeder and excess water, instead of pooling at the bottom of a solid drum feeder, will drain through the side mesh material of the body/cylinder. Alternatively, dry hay can be placed in the body of the feeder and soaked with water (in situ) in the body of the feeder.

Integrity of the helix flexible feeder (particularly in use, when a horse is pushing and pulling the feeder) is preferably provided by both the helical coil and a slow feeder restrictor plate, releasably secured to the top of the feeder body, forming a body lid which is hinged to open and expose an inner cavity of the feeder and also by an anchoring or weighting means in the bottom of the feeder. In a more preferred form the plate is releasably secured 3-4 inches below the top of the feeder body. This "depth" to the slow feeder plate contains feed which falls from the animal's mouth to be retained within the feeder, minimizing any feed that would otherwise slide off the slow feeder plate and fall onto the ground as waste. As a horse feeds and pulls hay through the apertures of the plate, and as the amount of hay in the body of the feeder is reduced, the helical coil itself retracts the plate downward to keep it in contact with the hay. This compresses the feeder body (via the coils). The restrictor plate may be formed of, for example, a flexible open weave mesh, metal or plastic.

In one such aspect, the body may comprise a fabric band of non-mesh (to contrast with mesh) material at a top moiety for the purpose, in part, of providing an attachment point for the plate. In one aspect, the fabric band extends from a top of the body to about 2-6 inches below the top, more preferably 3-4 inches. The band may be a band of vinyl or other suitable material, such material having the requisite integrity to hold a plate attachment means. The plate attachment means may be a loop, latch, or other such means.

An advantage of positioning the plate below the top of the feeder is to contain any loose hay within the sides of the feeder as the horse eats from the holes in the plate. This position reduces the amount of hay falling onto the ground or sand as is common with net type feeders when horses pull hay from the net openings. As such, there is less wastage of hay and the arrangement minimizes sand colic.

The feeder body may have a variety of shapes but preferably has either i) a substantially cylindrical shape or ii) a substantially conical shape (any, the "shape").

The rigid soaking/draining feeder offers similar advantages. If soaked hay is added, instead of excess water draining via porous material from the sides of the feeder, in this case, there is vertical drainage to a separated drainage chamber, under the feed chamber. Similarly, if dry hay is added, it may be soaked in situ in the feeder.

In the case of the rigid draining feeder, as the horse feeds and pulls hay through the apertures of the slow feeder tray, and as the amount of hay in the body of the feeder is reduced, the actual tray moves downwardly, until the feeder body is empty and the tray abuts the drainage plate.

III Details

Helix Flexible Feeder:

The helix-flexible feeder comprises:

a) feeder body having a top and bottom and formed by surrounding at least one helical coil with a covering material, wherein the feeder body has (preferably) either a substantially cylindrical shape or substantially conical shape (either, the "shape") and contracts and expands by the elasticity of the helical coil, and wherein the helical coil maintains the shape of the feeder body as the horse feeds;

b) a slow feeder plate releasably secured to the feeder body, forming a body lid which is hinged to open and expose an inner cavity of the feeder, said feeder plate comprising a plurality of access apertures there through, said apertures being sized such that, in use, access to feed in feeder is limited;

wherein, use said body comprises feed, said slow feeder plate with the aid of the helical coil, rests upon feed contained with the feeder body and moves down, as feed is consumed said slow feeder plate being sized such that, in use, access to feed in feeder body is available but controlled.

Preferably but not necessarily, the helix flexible feeder comprises an anchoring means to hold the body in place, and to prevent the body from tipping fully over, when in use. Such anchors, can include, but are not limited to, weights in the bottom of the feeder body, and clips to engage or removably connect the feeder to the ground or to another structure (such as, for example, part of the stall).

The reason for the anchor being an optional feature is quite simple: the use of the helical coil, heretofore never used in horse feeders, allows a horse to engage in natural feeding patterns and behaviors, even or especially in the absence of an anchor. For example, a horse may pick up the entire (non-anchored) helix flexible feeder and "play with it". It is flexible and will bounce. Some horse owners will appreciate and desire this feature. The horse will know/quickly learn which end is the "feed dispensing end" and will instinctively find and pull feed (for example hay) from the apertures within the slow feeder plate at that end. Whether an anchor is present or not, a key advantage of the feeder body comprising the helical coil is that, as a horse pulls on the feed through the apertures, the entire feeder body, via the helical coil, can extend (to the maximum extension of the selected coil) and then as the horse releases feed, "recoil" or "contract". The helical coils give the necessary flexibility and integrity to accomplish this. Pulling feed through apertures (preferably elliptical-shaped apertures) also most closely mimics grass feeding.

Some Other Advantages:

1. The helix flexible feeder's collapsible design provided by a helical coil, stores and transports efficiently occupying (75%) less space than rigid feeders having the same volume (such as, for example, prior known Porta Grazer and Slow Down Feeder). The collapsible design and materials used makes the feeder of the present invention (50%) lighter in weight than rigid feeders of the same volume, yet strength and durability are maintained
2. The materials used in the helical coil and feeder body, allows the feeder plate to (as noted above) oscillate significantly vertically, horizontally and diagonally as required by the animal to eat the forage underneath it, yet keeps the feeder plate in contact with the forage. This flexibility and design is an improvement over current rigid walled feeders using feed restriction plates or pans which permit only vertical and limited horizontal movement in their feeder pans or plates. These can become high centered and cause difficultly for the animal and prevent it from accessing the forage under the feeder plates or pans. Due to the oscillation provided by the helical coil feature, there is no special placement of the forage that must be used for the animal to eat, or learned behavior required by the animal. Unlike the Porta Grazer where the effective use by the animal requires the forage to be placed inside the feeder a certain way, and demands that the animal to learn to spin the feeder tray to effectively eat from the feeder. The fixed and non-rotating plate design of Slow Down Hay Feeder, only allows vertical movement of the feed plate to allow the animal to access the forage. In fact, the non-moving feed plate requires more openings, and therefore does not appreciably slow the horse's consumption.
3. The oscillation provided by the helical design and materials also permits a wide variation forage types and coarseness that can be fed without changing the configuration of the opening size or spacing in the feeder plate. This is an improvement over other patented designs as different configurations of the feeder plate must be used with different forage types or coarseness.
4. The design of the helix flexible feeder, with its flexible and its soft sides, prevents animal leg injuries associated with striking or stepping into conventional rigid feeders. Unlike other hay net type feeders which pose a risk of injury to a horse because of entanglement, the helix flexible feeder of the present invention reduces such risk due in part, to the maintenance of the cylindrical shape, even in use, and the formation material.
5. The helix flexible feeder creates a head down natural and healthy foraging position for the animal. This is in contrast to conventional net or feeder bags (Nibble Nets) which must be suspended above the animal to prevent injury from entanglement. The shell material of the feeder does not present a risk of entanglement and injury to the animal or horse that is shod as with net type or open weave feeders. (Various hay nets).
6. The helix flexible feeder's helical coil allows the feeder to be adjusted in height to suit the size animal being fed. Unlike rigid feeders that cannot feed smaller animals without structural alteration to the feeder.
7. The internal helical coil and, in one aspect, the preferred porous covering material (shell), allows forage and the feeder to be soaked in a container of water to remove harmful dirt, dust and excess non-structural carbohydrate laden water and allows these harmful residues to pass through. The helix flexible feeder with the forage inside can be lifted out of the water filled container. Current rigid feeders (Porta Grazer, Slow Down Feeder) waste large amounts of water because they must be filled with water each time and then drained to remove the water from the forage. The filling and draining time is significant. In addition, unwanted dirt and dust are retained at bottom of these feeders due incomplete draining as a function of design. The animals forage is not separated from the unwanted dirt and debris causing the animal to ingest the dirt that has collected at the bottom of the rigid feeder.
8. The helix flexible feeders design and material permits multiple soakings of the forage with complete separation of the unwanted debris and excess non-structural carbohydrates. Unlike conventional rigid closed feeders, the feeder allows water and air to freely drain from all sides of the forage while the animal is eating or accessing the feeder, eliminating bacterial and rapid mould growth on the forage that can be fatal to the animals if the forage remained inside a closed feeder.
9. Unlike conventional rigid feeders, where the animal must insert its head inside of the feeder obscuring its vision, with the helix flexible feeder because it collapses as the animal eats, the animal can maintain its vision and awareness of its surroundings. This eliminates eye injuries from the sides of the rigid feeders and injuries the animals being startled when eating out of a rigid closed feeder.
10. The helix flexible feeder's rigid or semi rigid plastic of metal feeder plate and configuration and size of openings restrict the animal's access to the forage. This restriction slows the animal's feed consumption rate which has been shown to reduce, potentially fatal colic, ulcers and intestinal related conditions in horses.

11. The collapsible design of the helical coil and flexible covering material allows it to be easily carried and stored and its light weight means ease of mobility for the owner.

Helix Flexible Feeder Operation:

Turning now to the FIGS. 1 through 9 and 13-15 in which preferred aspects are described:

FIGS. 1-9 depict a cylindrical body in which the feeder shell (6) is constructed from a flexible fabric or plastic material that can be varied in moisture permeability. The preferred material of the feeder shell (6) allows water, moisture and air to leave the surface of animal forage inside of the feeder shell. Although in one aspect the material is porous, the shell (6) still contains the forage effectively so that the animal must access the forage from the top of the feeder through the feed openings (7) in order to eat. A rigid or semi rigid plastic or metal feed plate (1) is attached at equally spaced internals (minimum 120 degrees) (2) to the fabric shell and helical coil (4) using plastic or metal retainers (3). The feed plate openings (7) can be varied in number, orientation or size. The size of these openings (7) is based on the animals muzzle size and may be round or oval approximating the geometry of the animals muzzle in shape. A lifting handle (8) is located in the center of the feed plate. The feed plate (1) is secured either in a flush position with the top of the feeder shell (6) or from 2 to 6 inches below the top of the feeder shell (6). The helical coil (4) is held in place inside a fabric or plastic sleeve (9) that encircles the diameter of the feeder in a helical shape multiple times, and extends to the vertical height of the feeder. The helical coil (4) may be made from round polyethylene tubing as the preferred material or, ABS, metal tubing or metal wire and can be of varying diameter (¼ to ¾ of an inch) and encircles the feeder shell multiple times and is free moving inside of the sleeve (9). The sleeve (4) is mechanically attached or sewn to the exterior or interior of the feeder shell (6). A rigid bottom plate (5) made from polyethylene, ABS or steel and is mechanically attached to the base of the feeder shell (6) to protect the feeder's bottom from abrasion and to give a low center of gravity to prevent tipping.

Figure 2:
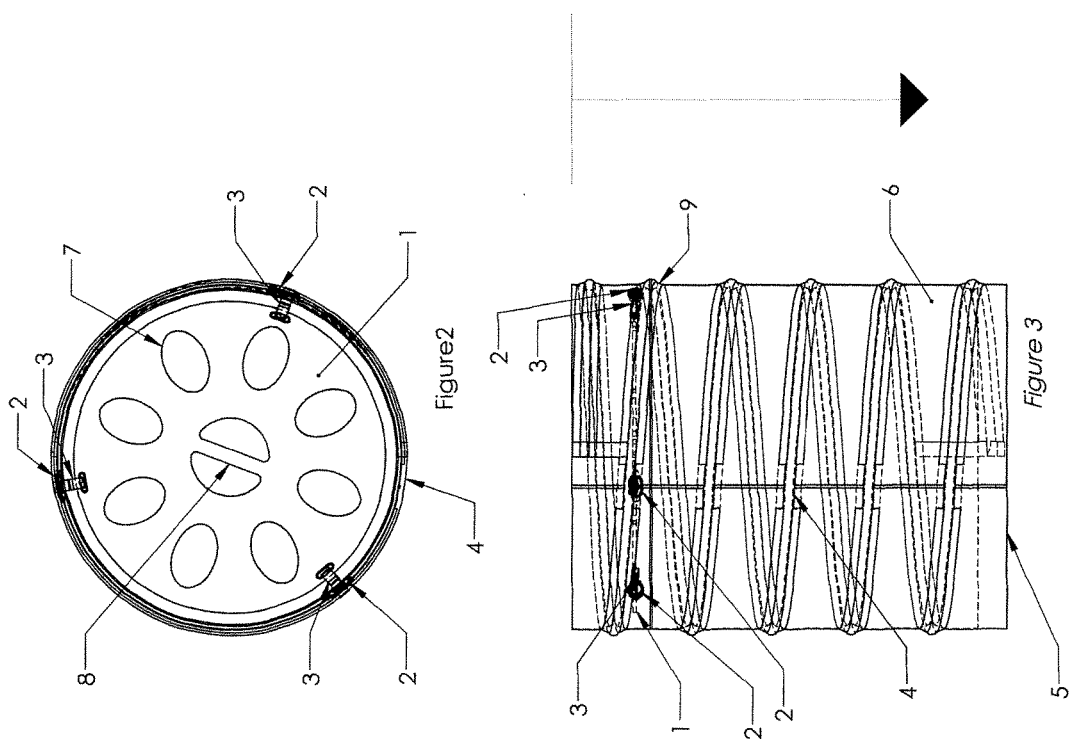
FIG. 2 is a top plan view of a helix flexible feeder in extended closed view.
Figure 3:
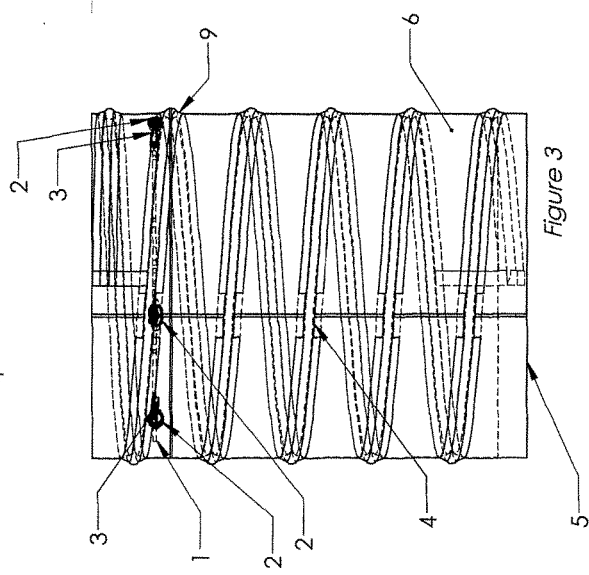
FIG. 3 side view of a helix flexible feeder in extended closed view.
Figure 7:
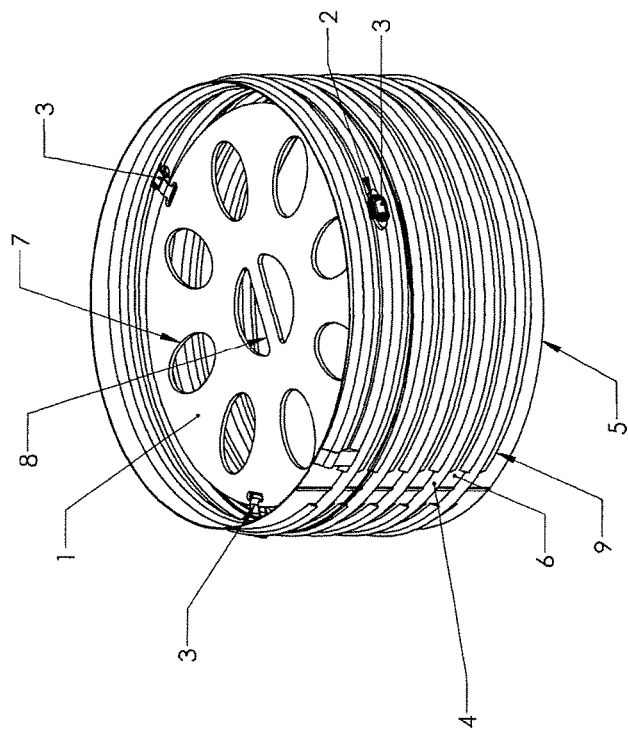
FIG. 7 is a perspective view of a helix flexible feeder in compressed view.
Figure 8:
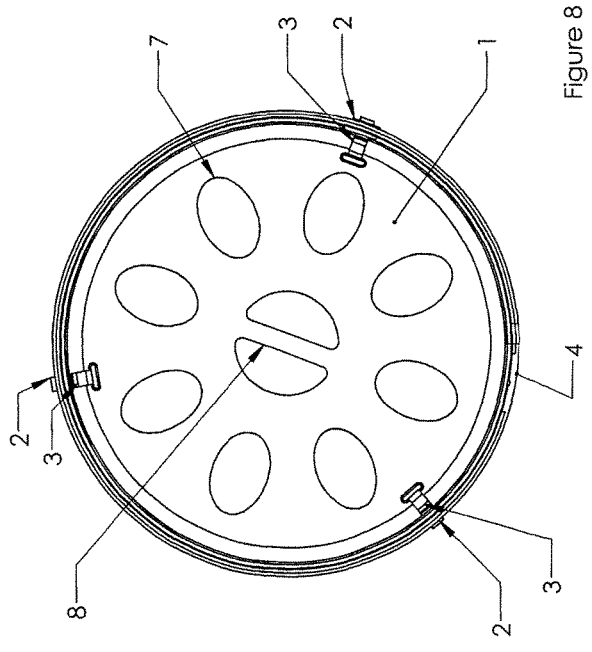
FIG. 8 is a top plan view of a helix flexible feeder in compressed view.
Figure 9:
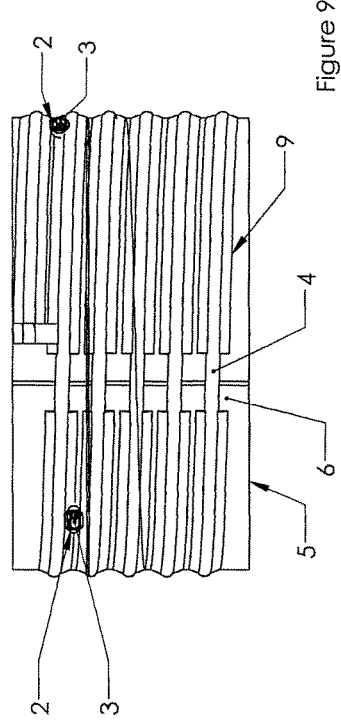
FIG. 9 side view of a helix flexible feeder in compressed view.

A quantity of animal forage is placed under the feed plate (1) by releasing one or more of the attaching fasteners (3) and expanding the feeder as illustrated in FIGS. 4, 5 and 6. The feed plate is then secured back into position using the attached fasteners as illustrated in FIGS. 1, 2 and 3. The feeder function is based on the helical coil (4) that allows the feeder shell (6) and rigid or semi rigid feed plate (1) to uniformly move up or down vertically, horizontally and diagonally and compress upon itself while the animal forage is inside as illustrated in FIGS. 7, 8 and 9. The helical coil (4) with the feed plate (1) attached also permits the feed plate to move vertically, horizontally and diagonally, as suited to the animals eating habits and movements. The movement provided by the helical coil (4) and the feeder plate (1) attached to it permits the animal to shift the feed plate position either vertically, horizontally or diagonally to permit animal access to forage between the feed plate openings (7). This eliminates issues with the animal having difficulty in spinning restriction tray as common in other feeders and eliminates special arrangement of the forage to be effective (Porta Grazer) The helical coil (4) although flexible, maintains and returns the feed plate (1) to remain in contact with the forage, and the cylindrical shape of the feeder shell (6) so that the feed plate (1) remains positioned on top of the forage ensuring that the animal has access to the forage underneath yet restricting its consumption. The helical coil (4) prevents the feeder shell from twisting onto itself common with other hay net type feeders, ensuring that feed plate (1) will always be positioned on top of the forage. As the animal eats the forage through the feed plate (1), the helical coil (4) can move either downward, diagonally or horizontally to maintain feed plate contact to the forage underneath. The helical coil (4) moves downward as the animal eats by slight compression tension within the helical coil (4) and gravity, and can be further compressed by the animal pushing downward of the feed plate (1), permitting the animal to eat all the forage placed in the feeder through the feed plate (1). As the animal continues to eat, and the feeder compresses to its reduced size as illustrated in FIGS. 7, 8 and 9. The size, shape and orientation of the feed plate openings (7) permits a predetermined and desired feed rate while slowing the animal's consumption of forage over a period of time, and its effectiveness is not subject to altering its effectiveness due to the coarseness or the type of forage being fed. The combination of the rigid or semi-rigid feed plate (1) and feed opening (7) size and configuration limits the animal's access to the forage, slowing the feed consumption over a period of time. The feeder also reduces the amount of forage that is wasted by not allowing the animal to step in the forage as it is eating and preventing the animal from tossing and spreading the forage on the ground because the forage is completely contained in the feeder. The fabric or material of the feeder's shell (6) does not permit the forage to pass through or dirt to pass to the inside of the feeder. The feeder design also allows the mitigation of other forage related health issues particularly in horses. Excess non-structural carbohydrates (NSC, i.e. sugars, starch or fructan), dirt and dust in forage cause a number of health related issues in cattle and horses. The feeder filled with forage can be partially or completely immersed in a container filled with water. Immersing the feeder with the forage in water allows the forage to be soaked multiple times to remove harmful residues from the forage. Wherein cover material is porous, it allows water access to the forage and removes these contaminates off the forage, yet contains the forage so that the entire feeder with the forage inside can be removed from the water. The shell material of the feeder because of the closeness of its weave eliminates any entanglement risks for the animal.

Although various body shapes are contemplated within the scope of the invention, at least for the flexible helix feeder, either cylindrical or conical are most preferred, as noted above. Each has advantages.

A conical shaped body provides, in one regard, shipping and transportation efficiencies. The body is narrow part of cone at "top" and wider part of the cone at "bottom. When compressed and for transport, each helix will fall within the one below. The cone shape means that the height of the body compressed may be as little as 3 inches as opposed to the generally 6 inch compressed height of the cylindrical version. There are some "in use" differences of the conical body as opposed to cylindrical body. In particular, the diameter of the base is generally larger in the conical body as opposed to cylindrical body. Preferably, the base diameter of conical body at bottom is from 24-28 inches, most preferably from 25-27 inches and even more preferably 26 inches. Conversely, the diameter of the top is generally smaller in the conical body as opposed to cylindrical body. Preferably, the top opening diameter of conical body is from 17-22 inches, most preferably from 18-21 inches and even more preferably 20 inches.

Soaking hay in situ in a conical body, with a wider base, will require finding a suitable soaking vessel of the requisite size.

Figure 13:
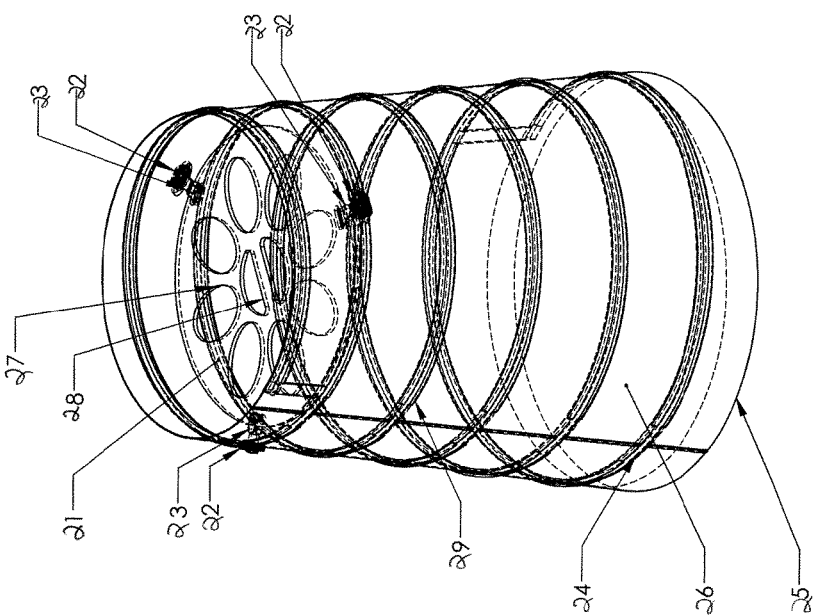
FIG. 13 is a perspective view of a helix flexible feeder, conical-shaped, in extended closed view.
Figure 14:
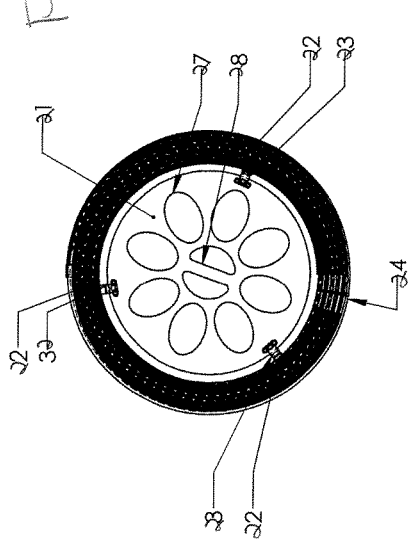
FIG. 14 is a top plan view of the helix flexible feeder of FIG. 13, in extended closed view.
Figure 15:
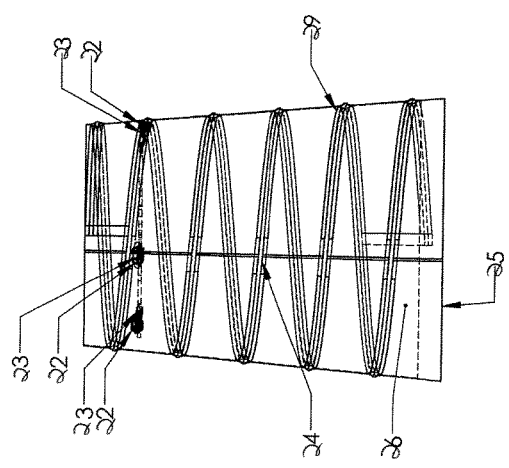
FIG. 15 is a side view of the helix flexible feeder of FIG. 13, in extended closed view.

FIGS. 13, 14 and 15 depict a conical body in which the feeder shell (26) is constructed from a flexible fabric or plastic material that can be varied in moisture permeability. The preferred material of the feeder shell (26) allows water, moisture and air to leave the surface of animal forage inside of the feeder shell. Although in one aspect the material is porous, the shell (26) still contains the forage effectively so that the animal must access the forage from the top of the feeder through the feed openings (27) in order to eat. A rigid or semi rigid plastic or metal feed plate (21) is attached at equally spaced internals (minimum 120 degrees) (22) to the fabric shell and helical coil (24) using plastic or metal retainers (23). The feed plate openings (27) can be varied in number, orientation or size. The size of these openings (27) is based on the animals muzzle size and may be round or oval approximating the geometry of the animals muzzle in shape. A lifting handle (8) is located in the center of the feed plate. The feed plate (21) is secured either in a flush position with the top of the feeder shell (26) or from 2 to 6 inches below the top of the feeder shell (26). The helical coil (24) is held in place inside a fabric or plastic sleeve (29) that encircles the diameter of the feeder in a helical shape multiple times, and extends to the vertical height of the feeder. The helical coil (24) is made from round polyethylene as the preferred material or ABS, metal tubing or metal wire and can be of varying diameter (¼ to ¾ of an inch) and encircles the feeder shell multiple times and is free moving inside of the sleeve (29). The sleeve (24) is mechanically attached or sewn to the exterior or interior of the feeder shell (26). A rigid bottom plate (25) made from polyethylene, ABS or steel and is mechanically attached to the base of the feeder shell (26) to protect the feeder's bottom from abrasion and to give a low center of gravity to prevent tipping.

These figures depict the feed plate (21) secured from 2 to 4 inches (preferably 3 inches) below the top of the feeder shell (26).

Rigid Soaking and Draining Feeder

In accordance with a further aspect of the invention, there is provided a horse feeder ("rigid soaking and draining feeder") comprising:

a) a solid feeder body having an opening at a top end, said feeder body comprising a upper main feed chamber and a lower drainage chamber, said upper main feed chamber being larger than the lower drainage chamber;

b) a drainage plate for separating the upper main feed chamber and the lower drainage chamber, said drainage plate comprising a plurality of drainage perforations of a size sufficient to permit excess water drainage from soaked hay without significant hay loss through said drainage perforations;

c) a water egress portal from lower drainage chamber; and d) a slow feeder tray comprising a horizontal base and vertical flange, said tray being of a size to be received within the top end of the feeder, to rest upon any feed contained with the feeder and to move down, within feeder, as feed is consumed by the horse, said horizontal base comprising a plurality of access apertures there through, said apertures being sized such that, in use, access to feed in feeder by the horse is available but limited.

Preferably, the Rigid Soaking and Draining Feeder Body is Cylindrical.

Advantages of Rigid Soaking and Draining Feeder

1. Laminitis is a debilitating disease that affects the feet of hooved animals (ungulates) and it is best known in horses and cattle. Laminitis in horses and cattle results when the animal eats forage that has accumulated excess non-structural carbohydrates (NSC, i.e. sugars, starch or fructan), it may be unable to digest all of the carbohydrate in the foregut. The excess then moves on to the hindgut and ferments in the cecum. The presence of this fermenting carbohydrate in the cecum causes proliferation of lactic acid bacteria and an increase in acidity. This process kills beneficial bacteria, which ferment fiber. These excess non-structural carbohydrates cause in increased insulin levels, which is known to trigger laminitis. The result of the excess insulin is body-wide inflammation, but particularly in the lamina of the feet, where swelling tissues have no place to expand without injury to other hoof structures. Clinical signs include foot tenderness progressing to inability to walk, inflammation, and increased temperature in the hooves. In serious cases, the horse or cow must be destroyed as the bones of the feet expand outwardly and rupture through the bottom of the animal's hoofs. The rigid soaking and draining feeder eliminates the issue of forage caused laminitis by allowing removal of excess non-structural carbohydrates by water soaking of the forage in combination with enabling the animal to eat at a more sustained and slower rate. Typically forage soaking must be done in a container separate from the feeding container. The soaked and drained forage is then placed in the feeding container. In the rigid soaking and draining feeder this can be done in the same container.

Figure 12:
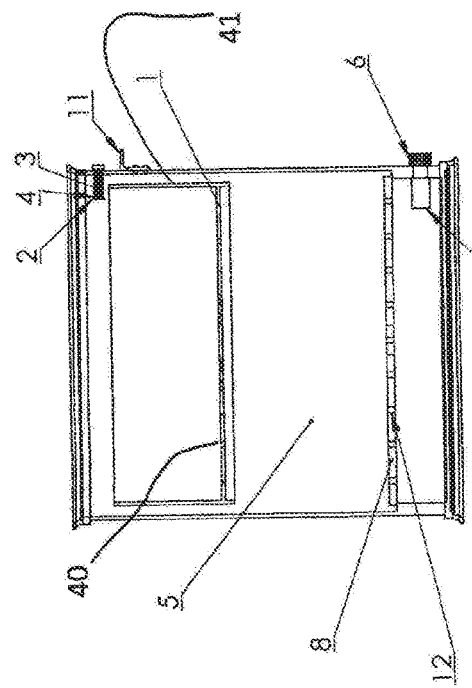
FIG. 12 side view of a rigid draining feeder.

2. A number of problems of soaking forage exist with other types of patented feeders. With the known Porta Grazer and the Slow Down Hay Feeder, when forage is soaked in the feeders, residual sugars and harmful residues from the forage like sand and dirt remain in contact with the forage as there is no physical separation between what the animal is eating and the excess undesirable residues collected at the bottom of these feeders. To eliminate these problems, the rigid soaking and draining feeder has a perforated plate, held off the bottom of the feeder on which the forage rests as illustrated in FIG. 12. The plate allows non-structural carbohydrate laden water and the harmful residues to pass through and be isolated below the forage as it is soaked and drained, preventing these residues from being eaten by the animal. Below the perforated plate a drain and a void space exists, which allow the user drain off non-structural carbohydrate laden water and other harmful forage residues without having to reposition the forage in order to effectively remove the residues. A drain opening is located above the bottom of the feeder but below the perforated plate. The location of the drain in combination with the perforated plate eliminates any clogging of the drain hole, which is an improvement over other patented feeders (Porta Grazer and the Slow Down Hay Feeder). The perforated plate allows the forage to continue and completely drain into the void space unlike the current feeder designs, which accumulate the harmful residues in the bottom of the feeders and cannot isolate these residues from the forage that the animal will eat. The Porta Grazer and Slow Down Hay Feeder, permits a slurry of harmful residues to collect and remain contact with the forage at the bottom of these feeders.

3. With soaking forage in other patented feeders (Porta-Grazer and Slow Down Hay Feeder) cleaning after feeding is required to eliminate the buildup of harmful residues and contact with the next feeding of forage to the animal. The rigid soaking and draining feeder's perforated plate and void space below it, keeps the forage isolated from the harmful residues, eliminating the need for cleaning following each feeding.

4. Other designs of forage feeders (for example, Porta Grazer & Slow Down Hay Feeder) use a pan or plate to restrict the animal's access to the forage, thereby slowing their forage consumption rate. In these designs a feeder pan or plate device must be aligned in specific way to be fully removed and re inserted into the feeder. The rigid soaking and draining feeder's feeder tray can be inserted in any alignment, which is made possible by a spring loaded u-shaped retention clip. This retention mechanism allows the feeder tray to be removed and inserted without specific alignment while still eliminating the removal of the tray by the animal. This allows faster loading and eliminates any issues with loading the feeder in low light or dark conditions, common in barns and farm locations.

5. The rigid soaking and draining feeder's apertures which are preferably elliptical, cause a slight clockwise or counter clockwise rotation in the feeder tray as the animal pulls the forage through the holes in the feeder tray. The slight rotation repositions the feeder tray on the forage so that there are no voids created below the feeder tray holes where the animal has already eaten. The repositioning of the feeder tray as the animal eats also allows the animal to eat the forage between the holes, giving the animal complete access to the forage underneath the feeder tray. This is an improvement on other designs (Porta Grazer) that utilizes round holes in their feeder pan and requires that the forage be loaded in a specific way to allow the horse access to the forage effectively. The animal must also learn to rotate the tray to eat the forage underneath the feeder pan. The manufacture provides instructions to these specific issues which if not followed result in frustration for the animal and can result in breakage of the feeder pan.

Figure 10:
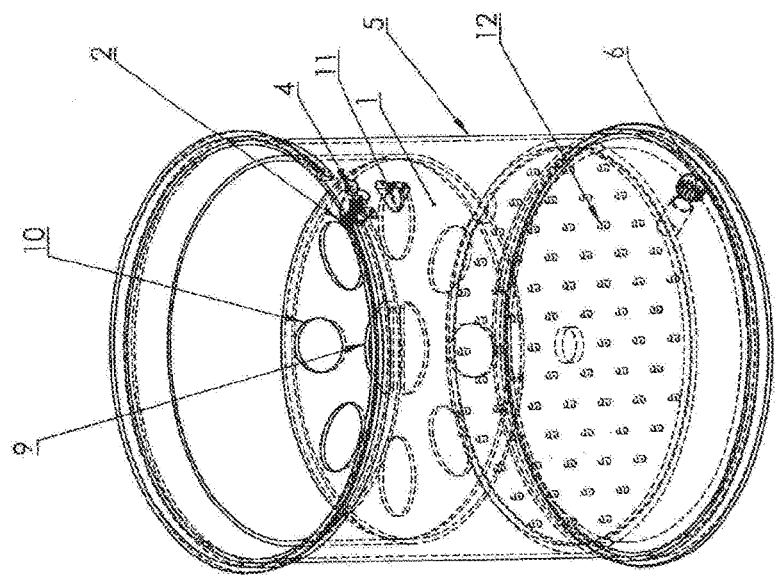
FIG. 10 is a perspective view of a rigid draining feeder.
Figure 11:
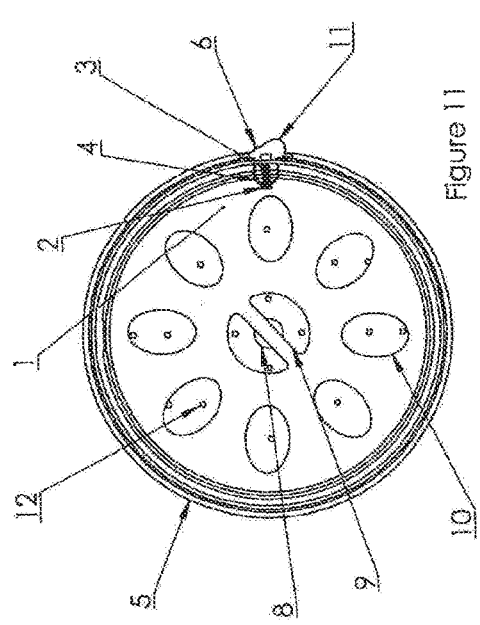
FIG. 11 is a top plan view of a rigid draining feeder.

Solid/Rigid Soaking and Draining Feeder, Illustrated in FIGS. 10, 11 and 12.

The feeder shell (5), feeder tray (1), u-shaped retention clip (4), and drain (6) are constructed from molded polyethylene plastic. The removable perforated drain plate (8) is made from sheet polyethylene plastic that is cut to a specific diameter and fabricated with the drain holes (12) to allow water and harmful forage residues to pass through into the void below it, and out the drain opening (6). The drain plate (8) is designed to fit inside the shell (5) and is set off the bottom of the feeder at the location in shown in FIG. 12. The feeder is used by depressing the u-shaped retention clip (4) outward which serves as a guide for the u shaped retention clip (2) and return spring assembly (3). The feeder tray (1), comprising a horizontal base (40) vertical flange (41), is then lifted up and out of the feeder shell (5) without any specific alignment, by the user grasping the center opening (9). This in an improvement on existing designs (Porta Grazer and Slow Down Hay Feeder).

The feeder tray (5) is removed from the body of the feeder by depressing the u shaped retention clip (2). Animal forage is placed inside of the feeder shell (5) on top of the drain plate (8), the feeder tray, also referred to interchangeably as slow feeder tray, (1) is then reinserted into the feeder shell (5). The feeder tray (1) is reinserted by using the tray itself to depress the u shaped retention clip (4) outward. As required by the user, the feeder can be filled with water to cover the forage which is kept in place inside the feeder shell (5) and held below the water level to ensure effective removal of the harmful residues by the feeder tray (1). Once the desire soaking period is completed, the drain (6) can be opened and the water and harmful residues allowed to flow out to below the level of the drain plate (8), creating a physical separation between the forage above the drain plate (8) from the residues. Any residues either leave the feeder by way of the drain (6) or are isolated below the drain plate (8). This is an improvement to the design of the Porta Grazer and Slow Down Hay Feeder drain functions, where the drain and forage are in the same horizontal plane, without separation and results in residues collecting and contacting the forage the animal will eat.

The feeder tray's (1) apertures (also referred to interchangeably herein as "openings") are preferably elliptically-shaped. This configuration and orientation (10) cause tray to rotate inside of the feeder shell (5) as the animal pulls the forage through the openings (10). This rotational movement allows the animal to access the forage located between the feeder tray openings (10) and continually beneath it. This is an improvement to the existing design of the Porta Grazer and the Slow Down Hay Feeder. The feeder tray openings (10) also reduce the animals forage consumption rate by limiting the amount of exposure to the forage beneath it. In addition, the feeder tray (1) is a smaller diameter than that of the feeder shell (5), and its diameter allows it to move downward by gravity as the animal eats from the feeder. The diameter of the feeder tray is such that it is can move in the indicated fashion but cannot be jammed against the feeder shell (5) by the animal. The u shaped retention clip (4), ensures that the animal cannot remove the feeder tray (1) upwardly while it is eating from the feeder shell (5) or by tipping the feeder over. The feeder can be secured in a desired position or location using the attached bracket (11).

As noted herein, it is preferred that the apertures or openings in the feeder tray are elliptically shaped. More preferably, the geometry of the ellipses (especially) in the rigid soaking/draining feeder is defined by the following ratio:

desired width, multiplied by 1.33 times to derive the length

By way of example: an ellipse with a width of 3.0 inches would be 4.0 inches in length. This ellipse size is appropriate for a wide variety of horse sizes.

A number of apertures (10) are formed through the feeder tray (1) to permit limited access to the feed below. With the feeder tray (1) in place in a feeder shell (5) the amount of feed available at any given time to the feeding animal is controlled through the apertures not to exceed an amount considered an adequate "mouthful". As the animal feeds, successive "mouthfuls" will become available through the apertures until the full amount is consumed. The feeder tray (1) will move downwardly within the feeder shell (5) as the feed level decreases during feeding.

In a preferred form, the feeder diameter is sized to the height or width of a flake of hay. By way of example, feeders may be 22 inches in diameter. The feeder tray/plate thickness in the solid/rigid soaking and draining feeder is preferably an eighth of inch, and the feeder plate in the helix feeder is preferably three eighths of an inch. Height wise, the feeders in a standard configuration are 27 inches tall. The helix feeder could easily be upsized for large round bales.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various devices and methods described above may omit some parts or acts, include other parts or acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

The invention claimed is:

1. A horse feeder comprising:
   a) a feeder body having a top and bottom and formed by surrounding at least one helical coil spring with a flexible water porous mesh covering material, or alternatively a flexible non-porous material to contain the hay, wherein the feeder body contracts and expands by the elasticity of the helical the coil spring, and wherein the helical coil maintains a shape of the feeder body and confinement of feed, as the horse feeds;
   b) a slow feeder plate releasably secured to the feeder body and comprising a plurality of access apertures there through, said apertures being sized such that, in use, access to feed in feeder is limited, wherein the slow feeder plate is releasably secured to the feeder body, forming a body lid which is hinged to open and expose an inner cavity of the feeder; and
   wherein, in use said body comprises feed, said slow feeder plate with the aid of the helical coil, rests upon any feed contained with the feeder body and moves down, as feed is consumed by the horse, said slow feeder plate being sized such that, in use, access to feed in feeder body by the horse is available but controlled and limited.

2. The horse feeder of claim 1 comprising an anchoring means.

3. The horse feeder of claim 1 wherein the access apertures are elliptical.

4. The horse feeder of claim 1 which comprises a height of about 4-6 inches in a collapsed/contracted form.

5. The horse feeder of claim 1 which comprises a height of about 24-32 inches in an expanded form.

6. The horse feeder of claim 1 wherein the body has either i) a substantially cylindrical shape or ii) a substantially conical shape.

7. The horse feeder of claim 1 wherein slow feeder plate is releasably secured just below the top of the feeder body.

8. The horse feeder of claim 1 wherein feeder plate is releasably secured 2-6 inches below the top of the feeder body.

9. A horse feeder comprising:
   a) a solid feeder body having an opening at a top end, said feeder body comprising an upper main feed chamber and a lower drainage chamber, said upper main feed chamber being larger than the lower drainage chamber;
   b) a drainage plate for separating the upper main feed chamber and the lower drainage chamber, said drainage plate comprising a plurality of drainage perforations of a size sufficient to permit excess water drainage from soaked hay without significant hay loss through said drainage perforations;
   c) a water egress portal from lower drainage chamber; and
   d) a slow feeder tray comprising a horizontal base and vertical flange, said tray being of a size to be received within the top end of the feeder, to rest upon any feed contained with the feeder and to move down, within feeder, as feed is consumed by the horse, said horizontal base comprising a plurality of elliptical access apertures there through, said apertures being sized such that, in use, access to feed in feeder by the horse is available but limited and wherein the slow feeder tray inserts into solid feeder body in any alignment by use a spring loaded u-shaped retention clip.

10. The horse feeder of claim 9 wherein the feeder tray has a vertical height of about 7-10 inches.

11. The horse feeder of claim 9 wherein the body is substantially cylindrical.

* * * * *